United States Patent [19]

Allen

[11] Patent Number: 5,737,389
[45] Date of Patent: Apr. 7, 1998

[54] TECHNIQUE FOR DETERMINING A COMPRESSION RATIO FOR USE IN PROCESSING AUDIO SIGNALS WITHIN A TELECOMMUNICATIONS SYSTEM

[75] Inventor: Jonathan Brandon Allen, Mountainside, N.J.

[73] Assignee: AT&T Corp., Middletown, N.J.

[21] Appl. No.: 573,743

[22] Filed: Dec. 18, 1995

[51] Int. Cl.$^6$ .............................. H04M 1/24; H04M 3/08; H04M 3/22
[52] U.S. Cl. .............................. 379/1; 379/347; 379/410; 379/52; 381/68.2; 381/68.4; 381/60; 600/25
[58] Field of Search .............................. 379/1, 9, 15, 31, 379/32, 34, 52, 127, 154, 155, 157, 457, 410, 387, 388, 389, 400, 406, 343, 347; 84/633, 645, 665, 695, 711, 727, 741; 381/60, 68.2, 68.4, 94, 101–103; 128/746; 600/25, 57

[56] References Cited

U.S. PATENT DOCUMENTS

| | | | |
|---|---|---|---|
| 3,809,811 | 5/1974 | Delisle et al. | 381/68.2 |
| 4,926,459 | 5/1990 | Advani et al. | 379/52 |
| 5,195,131 | 3/1993 | Bowker et al. | 379/410 |
| 5,195,132 | 3/1993 | Bowker et al. | 379/410 |
| 5,280,525 | 1/1994 | Wesel | 379/400 |
| 5,329,581 | 7/1994 | Friedes et al. | 379/92 |
| 5,388,152 | 2/1995 | Kawauchi | 379/157 |
| 5,388,185 | 2/1995 | Terry et al. | 395/2.14 |
| 5,524,148 | 6/1996 | Allen et al. | 379/387 |
| 5,539,806 | 7/1996 | Allen et al. | 379/52 |

OTHER PUBLICATIONS

U.S. application by J. B. Allen et al., entitled "Method For Customer Selection of Telephone Sound Enhancement," No. 08/311647, filed on Sep. 23, 1994.

U.S. application by J. B. Allen et al., entitled "Background Noise Compensation in a Telephone Set," No. 08/175038, filed on Dec. 19, 1993.

U.S. application by J. B. Allen et al., entitled "Background Noise Compensation in a Telephone Network," No. 08/175095, filed on Dec. 29, 1993.

The Journal of the Acoustical Society of America, 69(2), Feb. 1981, "Study of multichannel amplitude compression and linear amplification ofr persons with sensorineural hearing loss" by R. P. Lippman, L. D. Braida, and N. I. Durlach, Research Laboratory of Electronics, Massachusetts Institute of Technology, Cambridge, Massachusetts.

The Journal of the Acoustical Society of America, 88(2), Aug. 1990, "Loudness growth in 1/2–octave bands (LGOB) –A procedure for assessment of loudness" by Jont B. Allen, J. L. Hall, and P. S. Jeng, AT&T Bell Laboratories, Murray Hill, N.J.

The Journal of the Acoustical Society of America, vol. 53, No. 6, 1973, "Signal processing to improve speech intelligibility in preceptive deafness" by Edgar Villchur, Foundation for Hearing Aid Research, Woodstock, New York.

J. Audio Eng. Soc., vol. 32, No. 5, May 1984, "Dynamic Range Control of Digital Audio Signals" by G. W. McNally, BBC Research Department, Kingswood Warren, Tadworth, Surrey, UK.

Excerpts from "Speech and Hearing in Communication" by Harvey Fletcher, edited by Jont B. Allen, The Acoustical Society of America, 1995 pp. 1–35, p. 136, and pp. 188–189.

*Primary Examiner*—Curtis Kuntz
*Assistant Examiner*—Binh K. Tieu

[57] ABSTRACT

A "loudness balance" procedure is used to determine the amount of dynamic range for syllabic compression loss in an individual's cochlea. In particular, an individual is asked to adjust a set of tone volumes, which are played to them, until the tone volumes sound equally loud. Based on the adjustments performed by the individual, a compression ratio is determined for that individual over at least one frequency band. The determined compression ratio is then subsequently used by a telecommunications system to provide an individual-specific sound enhancement in a telephone call. As a result, the individual-specific sound enhancement particularly compensates for an amount of hearing loss unique to that individual.

36 Claims, 3 Drawing Sheets

TECHNIQUE FOR DETERMINING A COMPRESSION RATIO FOR USE IN PROCESSING AUDIO SIGNALS WITHIN A TELECOMMUNICATIONS SYSTEM

CROSS-REFERENCE TO RELATED APPLICATIONS

Related subject matter is disclosed in the co-pending commonly assigned, U.S. patent applications of Allen et al., entitled "Method For Customer Selection of Telephone Sound Enhancement," Ser. No. 08/311,647, filed on Sep. 23, 1994.

BACKGROUND OF THE INVENTION

The present invention relates to telecommunications systems and, more particularly, to methods and apparatus for the processing of audio signals to enhance the audibility of speech.

The co-pending, commonly assigned, United States patent application of Allen et al., entitled "Method for Customer Selection of Telephone Sound Enhancement," Ser. No. 08/311,647, filed on Sep. 23, 1994 describes a way to provide a "sound enhancement" service in a telecommunications system. Generally speaking, the "sound enhancement" service changes the amplitudes of an audio signal transmitted to an individual during a telephone call. As used herein, the term "audio signal" represents an electrical signal, which, upon transduction, becomes an acoustical signal.

For example, over a given frequency mad dynamic range, some amplitudes may be compressed, others expanded, and some not changed at all. The distinctive type of "sound enhancement" is performed as a function of the identity of a person, or subscriber, on the listening-end of the telephone call.

In particular, the above-mentioned co-pending application describes the ability of a subscriber to select the desired sound enhancement from a set of predefined sound enhancements. For example, a subscriber could "dial-in" to a test platform, e.g., via an 800-type service, and listen to a recording as processed by each one of the set of predefined sound enhancements. The set of sound enhancements could cover a range from "no sound enhancement" through "high sound enhancement." The subscriber then simply chooses the processed recording they like via, e.g., the touch-tone keypad of a telephone set. Unfortunately, by its very nature, hearing-ability varies from individual to individual. Consequently, any one of a pre-set number of sound enhancements that may work for one subscriber may not be effective for another subscriber. This is particularly true in the case of hearing-impaired individuals since the amount of syllabic compression loss within the cochlea of each ear can vary across frequencies. (As used herein the term "compression" refers to "syllabic compression" as known in the art. See, e.g., "Signal processing to improve speech intelligibility in perceptive deafness," Edgar Villchur, J. Acoust. Soc. Am., Vol. 53, No. 6, pp 1646–1657.) As a result, it would be desirable to be able to determine—on an individual basis—the amount of compression required in a sound enhancement that compensates for the compression loss in the cochlea of that individual.

Various techniques are known in the art to measure a person's hearing ability, referred to herein as "loudness perception." For example, a "Loudness Growth Method" is described in the paper entitled "Loudness growth in ½-octave bands (LGOB)—A procedure for the assessment of loudness," Allen et al., J. Acoust. Soc. Am., Vol. 88, No. 2, August 1990, pp 745–753. In this method, the basic test consists of a series of noise bursts presented to a person in a soundproof room or over earphones. The person is then asked to characterize the series of noise bursts into a number of predefined levels like very soft, loud, too loud, etc. This basic test is repetitively performed and the intensity of the series of noise bursts is varied in a predefined manner. From these tests, an assessment and quantification of the loudness perception for the individual is determined in less than 30 minutes. Unfortunately, while this approach is advantageous under some situations, in the context of a telecommunications service it is not a practical way of quickly estimating a person's loudness perception.

SUMMARY OF THE INVENTION

Therefore, and in accordance with the invention, the following technique quickly estimates a person's loudness perception. In particular, an individual listens to, and adjusts, a test signal pattern. The amount of adjustment of the test signal pattern by the individual is then used to determine the amount of compression loss in the individual's cochlea.

In an embodiment of the invention, a "loudness balance" procedure is used. In particular, a subscriber is asked, via a telephone, to adjust a set of tone volumes, which are played to them, till the tone volumes sound equally loud. Based on the adjustments performed by the subscriber a compression ratio is determined for that subscriber over at least one frequency band. The determined compression ratio is then subsequently used in a telephone call to specify a subscriber-specific sound enhancement that particularly compensates for an amount of hearing loss unique to that subscriber. In fact, everyone may be able to benefit from some compression of selected frequencies of an audio, or acoustical, signal transmitted to them.

DETAILED DESCRIPTION

In the description that follows, it is to be understood that the term "subscriber" is used to refer to any person using a telephone station identified by a particular automatic number identifier (ANI), regardless of whether that person is the actual person that has contracted with a communications company for telephone service. For example, a subscriber could include all members of a household, as well as persons visiting a household that might use the household telephone to place, or answer, calls.

Figure 1:
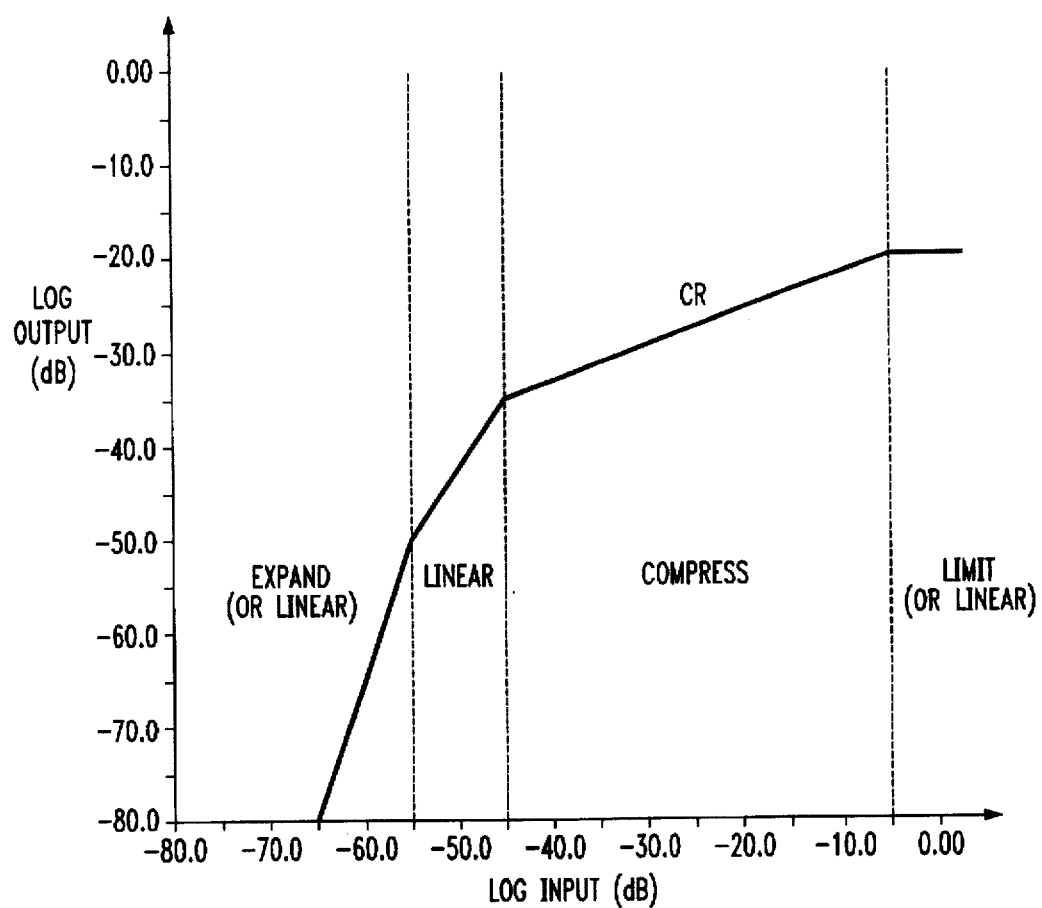
FIG. 1 is an illustrative graph illustrating an input-output relationship in accordance with providing a sound enhancement.

As described above, the co-pending application of Allen et al. describes a sound enhancement service in which a particular sound enhancement (or no enhancement at all) is applied on a call-by-call basis. A person placing or receiving a call at a telephone station with a given telephone number or ANI manually selects the sound enhancement service to be applied for a given call. Alternatively, the telecommunications network determines the identity of the person placing or receiving the call, and automatically applies the pre-selected sound enhancement for the identified person. The sound enhancement is achieved by modifying in the telephone network audio signals transmitted to a subscriber so as to change the amplitude of the signals (i.e., volume of sound) over a given dynamic range. FIG. 1 shows a log-log plot of an input-output relationship for an illustrative sound enhancement. As can be observed from FIG. 1, there are ranges of input signal amplitudes over which the processing of the input signal amplitude is different. In FIG. 1 there are four regions: an expansion region, a linear region, a compression region, and a limiting region. In practice, the numbers and types of regions vary depending on the application. This is illustrated in FIG. 1 by showing that the expansion region and the limiting region could, instead, be designated as linear regions. Techniques and apparatus for modifying the characteristics of the sound provided to a telephone are disclosed in U.S. Pat. No. 5,195,132, issued Mar. 16, 1993, and entitled "Telephone Network Speech Signal Enhancement." As discussed above, this capability can be used to improve the quality and intelligibility of telephone speech. However, a pre-set sound enhancement that may work for one subscriber may not be effective for another subscriber. This is particularly true in the case of hearing-impaired individuals since the amount of compression loss within the cochlea of each ear can vary across frequencies. As a result, it would be desirable to be able to determine—an individual basis—the amount of compression required in a sound enhancement that compensates for the compression loss in the cochlea of that individual. Therefore, and in accordance with the invention, I have discovered a way to personalize a sound enhancement by quickly estimating a person's loudness perception. In particular, an individual listens to, and adjusts, a test signal pattern. The amount of adjustment of the test signal pattern by the individual is then used to determine the amount of compression loss in the individual's cochlea.

Before describing a specific exemplary network architecture for implementing the invention, it will be useful to describe in a general mariner the key intelligent network elements which can be used to implement the invention. Intelligent network systems suitable for implementing the invention, in view of this disclosure, are well-known in the art and commercially available from AT&T Corp. ("AT&T") under the A-I-Net™ advanced intelligent network family of products.

The intelligent network architecture superimposes on an existing telecommunications system a modular configuration of network elements which provide enhanced telecommunications services. Switching functions are performed by the base network in a conventional manner. The intelligent network includes a service switching point (SSP), a service common point (SCP), and a service management system (SMS). The intelligent network also may include an intelligent processor (IP). One skilled in the art will appreciate that the intelligent network elements could be owned or controlled either by a local exchange carrier (LEC) or an interexchange carrier (IXC), or both.

The SSP is a switch that operates to recognize service requests, requests call handling instructions from an SCP, and executes those instructions to complete a telephone call. The SSP provides intelligent network "triggering" —detecting a condition which requires the SSP to initiate the intelligent network service by sending a query to the SCP— used by the network to recognize requests. The SSP also formulates and transmits requests to the SCP and processes replies and requests from the SCP. The SSP creates and plays intelligent network announcements formulated by the service provider (e.g., the local exchange or inter-exchange carrier), and transmits event messages (such as busy or no reply signals) to the SCP. The SSP illustratively is an AT&T 5ESS® switch provisioned with AT&T's A-I-Net™ intelligent software to provide SSP functionality.

The SCP is an intelligent network element which stores call control and call routing instructions executed by an SSP. The SCP receives requests from the SSP and determines the destination telephone number. The SCP receives and processes event messages from the SSP, and formulates and sends responses to the SSP. The SCP processes accounting and statistical information, such as the number of the calling party, the dialed intelligent network number, duration or type of ringing tone or call waiting signal, and other such call parameters. The SCP interfaces with and receives commands from controlling services and service features from the SMS. The SCP illustratively is AT&T's A-I-Net™ SCP.

The SMS (not shown) is a management and provisioning system that serves as an intelligent network service administration platform. The SMS formulates and sends commands to the SCP to control services and service features. The SMS illustratively is an AT&T A-I-Net™ service management system.

The IP provides specialized functionality, such as speech recognition (identifying spoken words) and voice recognition (recognizing the voice of a particular speaker) capability. The IP also may perform the functions of a video signal generator or video signal database for applications such a providing images for call waiting signals for video telephone calls. The functionality of the IP may be implemented in a separate network element, or may be implemented through a multimedia SCP. Service provided by the IP may include, for example, voice digit dialing, name dialing, and voice recognition for authenticating the identity of an individual. IP equipment suitable for use with the invention are well known in the art of intelligent network systems.

Figure 2:
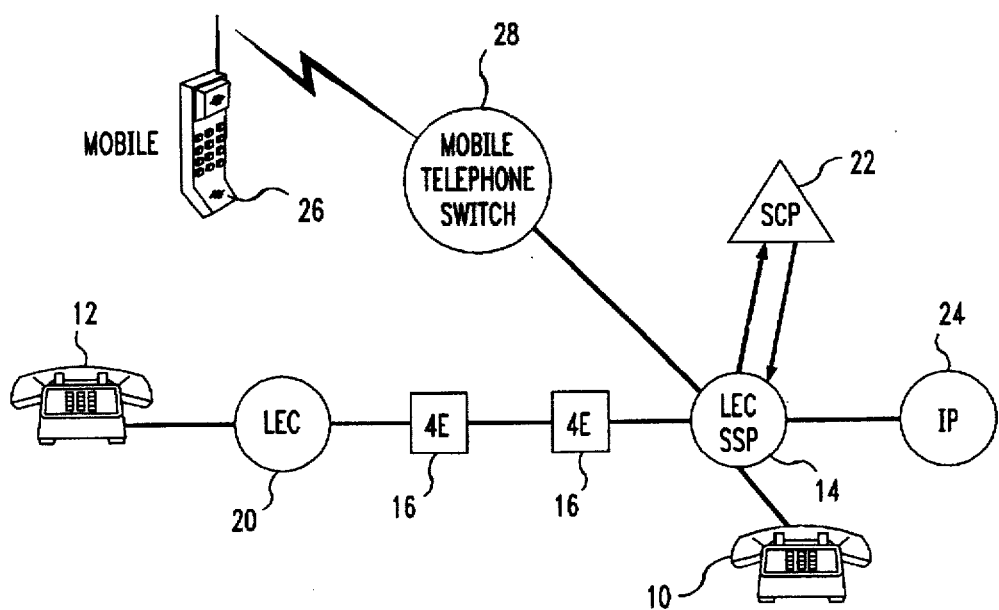
FIG. 2 is a block diagram of a telecommunications system embodying the principles of the invention.

Having described in a general manner the function of the principal intelligent network elements, a specific exemplary network architecture suitable for implementing the inventive concept will is shown in FIG. 2. For the purposes of the following description it is assumed the telecommunications system of FIG. 2 implements the "sound enhancement" service as described in the above-mentioned co-pending patent application of Allen et al. Since the telecommunications network of FIG. 2 implements the "sound enhancement" service, for the sake of completeness, the telecommunications network of FIG. 2 includes telephone station sets 10, 12, and 26 (representing calling and called endpoints), mobile switch 28, LECs 20 and 14 (representing the corresponding local exchange carriers), interexchange carriers (IXCs) 16 and 18, SCP 22 and IP 24. However, the description below will only focus on telephone station set 10, LEC 14, and SCP 22. In the following description, a generic telephone receiver (not shown) is assumed in telephone station set 10. At this time, reference should also be made to FIG. 3, which shows an illustrative method embodying the principles of the invention for use in the telecommunications system of FIG. 2.

Generally speaking, in steps 110 to 135 of FIG. 3 (described in detail below), a "loudness balance" procedure is used to estimate the compression loss, if any, in the cochlea of a subscriber across a range of frequencies. For simplicity, the "loudness balance" procedure is described below in the context of a single probe signal comprising a tone at 3 kHz and a reference signal comprising a tone at 1 kHz. Measurement of compression loss at other frequencies, or frequency ranges, is a straight forward extension and will not be described herein.

Figure 4:
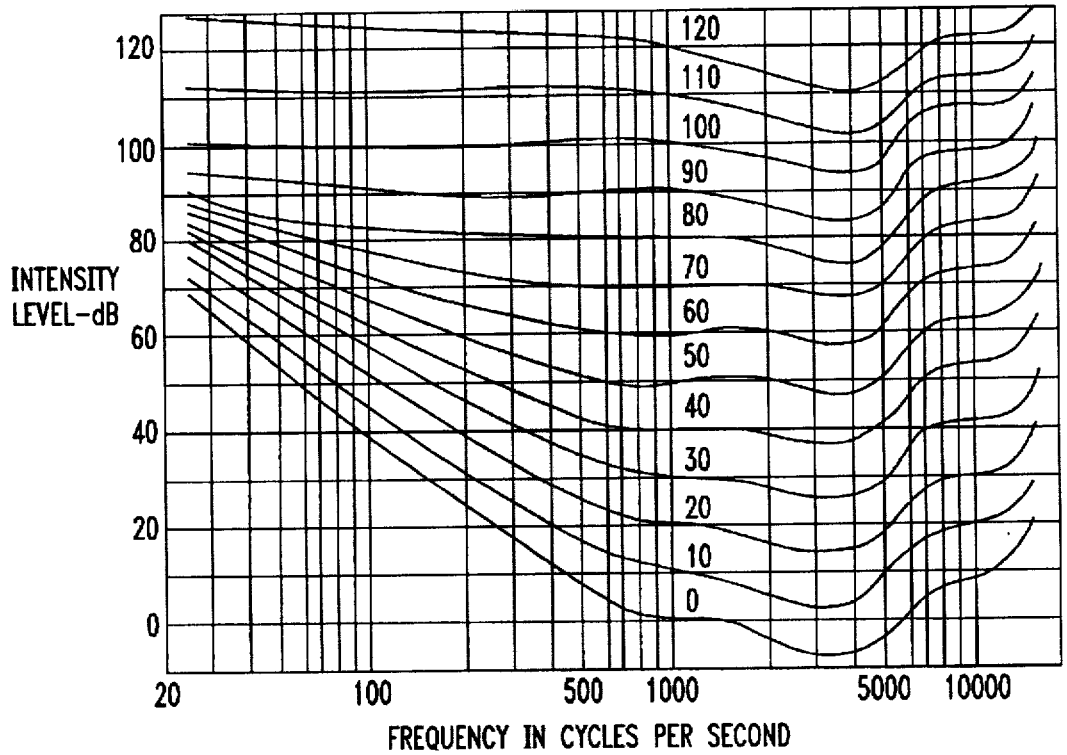
FIG. 4 is an illustrative graph illustrating some acoustical concepts.

In accordance with the inventive concept, the subscriber is asked to adjust a set of tone volumes, which are played to them, till the tone volumes sound equally loud. As known in the art, loudness perception varies with the frequency and intensity of sound. This is illustrated in FIG. 4, which is a representative plot showing intensity level in decibels (dB) on the ordinate versus frequency on the abscissa for free space. Also shown in FIG. 4 is a series of "loudness level contours," each of the which corresponds to a particular "loudness level," which is, as known in the art, in a unit of "phons." (It is well-known that, by definition, the intensity level of a 1 kHz tone in dB corresponds to the "loudness level" in phons as shown in FIG. 4.) As can be observed from FIG. 4, a tone at 1 kHz, at an intensity level of 20 dB, and a tone at 500 Hz, at a different intensity level of 25 dB, have the same "loudness level" of 20 phons.

Figure 5:
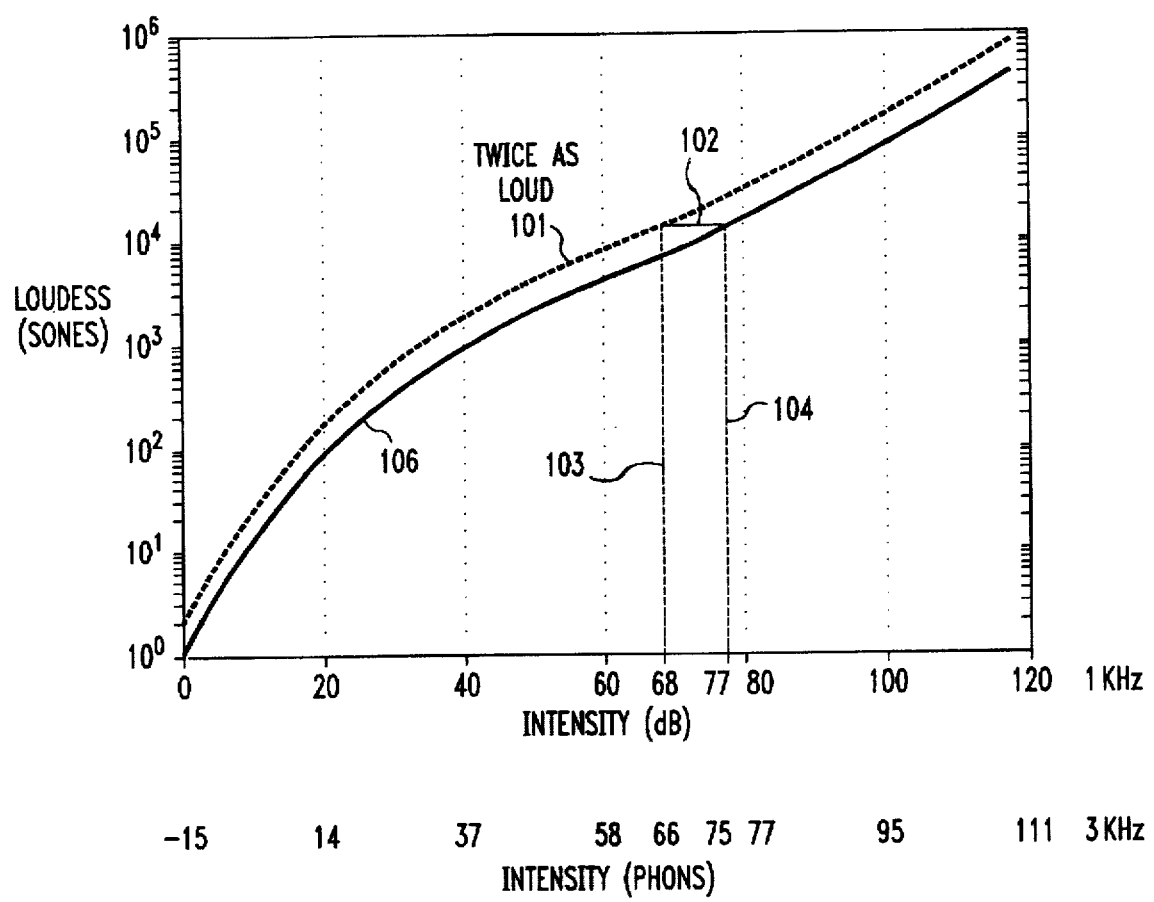
FIG. 5 is another illustrative graph illustrating some acoustical concepts.

It is also known that the total loudness of two tones played together is generally twice that of either tone played alone at the same "loudness level," assuming the tones are sufficiently far apart so that they do not mask each other. This is illustrated in FIG. 5, which is a representative plot showing "loudness" in sones on the ordinate versus intensity in decibels (dB) for a frequency of 1 kHz and "loudness level" in phons for a frequency of 3 kHz on the abscissa. Referring to solid line 106 shown in FIG. 5, it can be observed that a 1 kHz signal at 68 dB sounds the same as a 3 kHz signal at 66 dB on this representative plot. This is highlighted by reference line 103. Also shown on FIG. 5 is dashed line 101, which represents a set of points that are twice as loud as the "loudness" represented by line 106. For example, the total loudness of a 68 dB tone at 1 kHz along with a 3 kHz tone at 66 dB is equal to the loudness of a signal 1 kHz tone at 77 dB. This is highlighted by reference lines 102 and 104.

It should be realized that solid line 106 of FIG. 5 generically represents the pure tone loudness perception for a typical normal hearing person. From this curve, a compression ratio as known in the art can be determined. However, the problem is determining this curve anew for each individual, especially those individuals with a hearing impairment. Therefore, and in accordance with the inventive concept, I have realized that loudness perception for an individual can be quickly estimated by using a loudness balance procedure to determine an individual-specific compression ratio across a range of frequencies that does not require determination of the loudness curve for that individual.

Figure 3:
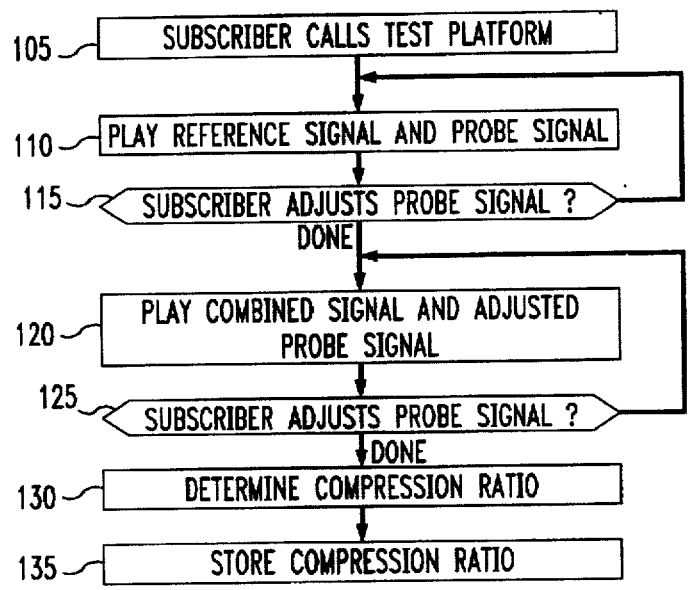
FIG. 3 is a flow chart embodying the principles of the invention.

Turning now to each of the steps of FIG. 3, assume for purpose of illustration that a subscriber at telephone station set 10 subscribes to the "sound enhancement" service and wishes to establish a personalized sound enhancement for subsequent use in, e.g., a telephone call to another subscriber located at either mobile station 26 or telephone station set 12. In step 105, the subscriber at telephone station set 10 dials a predefined number, e.g., an 800-type number. The predefined telephone number is associated with subscriber administration of the "sound enhancement service," hereinafter referred to as a "test platform." LEC switch 14 is provisioned to provide the SSP functionality described above and as shown in FIG. 2.

Before proceeding with this description, those in the art will realize that steps 110 to 135 of FIG. 3 are representative of a voice-response operation, i.e., LEC switch 14 plays announcements to the subscriber requesting the subscriber to enter digits or voice commands, and collects the requested information from the subscriber. For example, a recording is played to the subscriber first informing the subscriber of what is to happen, e.g., "a sequence of tones is about to be played," "press 'D' to adjust the volume down," "press 'U' to adjust the volume up," "press '#' when finished," etc. Also, other variations area possible. For example, speech recognition could be used instead of, or in combination with, the above-mentioned key-pad presses. Since those skilled in the art can realize a variety of ways of realizing a voice-response operation in as user-friendly a manner as possible, the description of steps 110 to 135 only illustrate that portion of the voice-response operation representative of the inventive concept. In addition, it is assumed below that the subscriber responds. As such, although not described herein, suitable time-outs and defaults can also be implemented in a voice-response system should the subscriber fail to respond.

Upon detection of the called number associated with the "test platform," LEC switch 14 plays a 1 kHz reference signal and a 3 kHz probe signal in alternating fashion to the subscriber in step 110. The 1 kHz reference signal is a narrow-band signal, i.e., a tone, centered about 1 kHz at 68 dB, which is the standard sound intensity for telephone speech. The 3 kHz probe signal is a narrow-band signal centered about 3 kHz and is initially also played at a sound intensity of approximately 68 dB. The duration of each is, illustratively, 1 second. It is assumed that LEC switch 14 includes a translation table for converting the amplitude of an audio signal to the equivalent intensity in dB given a generic telephone receiver. Since one skilled in the art knows how to translate between electrical signal levels and sound intensity in dB, given particular audio receiver characteristics, it is not described herein.

In step 115, the subscriber is asked to adjust the intensity of the 3 kHz probe signal either up, or down, until the loudness of the 3 kHz probe signal approximates (or sounds the same as) the loudness of the 1 kHz reference signal as perceived by the subscriber. As mentioned above, such an adjustment can be performed in LEC switch 14 in response to certain predefined keypad presses, e.g., using the touch-tone associated with "U" for increasing the sound intensity, or by using speech recognition. As shown in FIG. 3, after every adjustment of the sound intensity of the 3 kHz probe signal, the 1 kHz reference signal and the 3 kHz probe signal (at the new adjusted sound intensity level) are again alternately played to the subscriber user in step 110. Once the subscriber is satisfied that the 3 kHz probe signal sounds equal in loudness to the 1 kHz reference signal, the subscriber enters an appropriate response, e.g., pressing the "#" key and LEC switch 14 goes to step 120. At this point, the loudness of the 1 kHz reference signal should be approximately equal to the loudness of the adjusted 3 kHz probe signal as perceived by the subscriber. For example, it is assumed herein that the subscriber adjusted the intensity of the 3 kHz tone to 66 dB in order to sound like the 1 kHz tone at 68 dB. LEC switch 14 keeps track of, or stores, the corresponding adjustment to the signal intensity after step 115. This adjustment is represented herein by Adjustment$_1$, in dB.

In step 120 of FIG. 3, LEC switch 14 plays a "combined signal" and the 3 kHz probe signal in alternating fashion to the subscriber. The combined signal is simply the 1 kHz reference signal at a sound intensity of 68 dB and the 3 kHz probe signal at a sound intensity corresponding to Adjustments. As noted above, if two tones sound equally loud, then a combined signal will be twice as loud. As a result, in this example a 1 kHz tone at 68 dB combined with a 3 kHz tone at 66 dB sounds twice as loud to the subscriber as each tone played individually. From FIG. 5, twice as loud is about a 9 dB increase in sound intensity.

In step 125, the subscriber is again asked to adjust the intensity of the 3 kHz probe signal either up, or down, until the adjusted 3 kHz probe signal sounds equal in loudness to the combined signal as perceived by the subscriber. As shown in FIG. 3, after every adjustment of the 3 kHz probe signal, the combined signal and the adjusted 3 kHz probe signal are again played to the subscriber in step 120. Once the subscriber is satisfied that the 3 kHz probe signal sounds equal in loudness to the combined signal, the subscriber enters an appropriate response, e.g., pressing the "#" key and LEC switch 14 goes to step 130. LEC switch 14 keeps track of the corresponding adjustment to signal intensity after step 125. This adjustment is represented herein by $Adjustment_2$, in dB. At this point, the loudness of the combined signal should be equal to the loudness of the 3 kHz probe signal as perceived by the subscriber. Again, assume in this example that the subscriber adjusts the intensity of the 3 kHz tone to 75 dB in order to sound like the combined signal. For illustrative purposes, the numbers used above are representative of normal hearing as illustrated in FIG. 5 for the purpose of describing the inventive concept. If the subscriber has normal hearing at 3 kHz, they should turn up the 3 kHz tone until it is 9 dB greater in level. This is illustrated in FIG. 5 by line 102.

However, as noted above, the corresponding loudness curves for a particular individual are known. Notwithstanding this, the inventive method illustrated in FIG. 3 takes advantage of the known observation that the total loudness of two tones played together is twice that of either tone played alone. Therefore, and in accordance with the inventive concept, the final adjustment, $Adjustment_2$, is used to estimate the subscriber's loudness perception, and therefore, the amount of compression loss, if any, in the cochlea of the subscriber.

In particular, the compression ratio is calculated as follows. A loudness level, $L_o$, is equal to:

$$L_o = l_o^{1/CR}, \qquad (1)$$

where $l_o$ represents an corresponding intensity level, and CR is the compression ratio. For a loudness level that is twice as loud, equation (1) becomes:

$$2L_o = (a_u^2 l_o)^{1/CR}, \qquad (2)$$

where $a_u$ represents an unknown adjustment to the intensity level $I_o$ to double the loudness. The unknown adjustment, $a_u$, is squared to represent the fact that intensity is proportional to power, e.g., analogously the square of a corresponding voltage adjustment. Equation (2) can be simplified to:

$$2L_o = a_u^{2/CR} l_o^{1/CR} \qquad (3)$$

It can be observed from equation (3) that the term $l_o^{1/CR}$ can be replaced by the term $L_o$ from equation (1), yielding:

$$2L_o = a_u^{2/CR} L_o, \qquad (4)$$

or $$2 = a_u^{2/CR} \qquad (5)$$

Taking the $\log_{10}$ of both sides, equation (5) becomes:

$$\log_{10}(2) = \log_{10}(a_u^{2/CR}), \qquad (6)$$

or, $$\log_{10}(2) = 2/CR \; \log_{10}(a_u) \qquad (7)$$

Converting equation (7) into dB provides further simplification:

$$20\log_{10}(2) = 20(2/CR \; \log_{10}(a_u)). \qquad (8)$$

From equation (8), the compression ratio, CR, is represented as:

$$CR = 20\log_{10}(a_u)/10\log_{10}(2). \qquad (9)$$

However, the term $20\log_{10}(a_u)$ is simply the adjustment in dB to double the loudness, i.e., this is the $Adjustment_2$ term referenced above after step 125 of FIG. 3:

$$CR = Adjustment_2/10\log_{10}(2), \qquad (10)$$

or, $$CR = Adjustment_2/3. \qquad (11)$$

Consequently, in the case of normal hearing, where $Adjustment_2$ is equal to 9 dB, the compression ratio, CR, is equal to 3. On the other hand, if the subscriber increases the 3 kHz signal by an amount that is less than 9 dB for $Adjustment_2$, then the subscriber may have a loss of compression within the cochlea, and the subscriber may be in need of signal compression to improve the audibility of a received audio signal. For example, if the subscriber adjusted the 3 kHz probe signal to 70 dB (2 dB for $Adjustment_1$) after step 115, and further adjusted the 3 kHz probe signal to 75 dB (5 dB for $Adjustment_2$) after step 125 then the amount of compression from equation (11) is equal to 1.66.

As a result of the above simple test sequence, it is possible to identify the gain required at a low signal level versus the gain required at high signal level for a subscriber. In step 130, LEC switch 14 calculates that above-described compression ratio for the subscriber from the amount of adjustment of the test signal pattern performed by the subscriber. This determines the compression slope at 3 kHz for the subscriber. Other compression ratios at other frequencies or frequencies bands can be determined in a similar fashion. As a result, the present invention determines a proper compression ratio, as a function of frequency, for customers of a sound enhancement service by a simple test taken over the telephone. In fact, the inventive concept is equally applicable to other environments such as sound booths, earphones, etc., and the resulting compression ratios can be used in hearing aids or other personal communications devices.

Turning back to FIG. 3, the resulting adjustment values are then provided by LEC switch 14 to SCP 22 for storage in step 135 for use in personalizing a sound enhancement for the subscriber illustratively associated with telephone station set 10. As a result, in a subsequent telephone call between the subscriber located at telephone station set 10 and, e.g., another person at telephone station set 12, SCP 22 uses these adjustment values as part of the sound enhancement service to cause, e.g., LEC switch 14, to modify the amplitude of an audio signal transmitted to the subscriber at telephone station set 10. In this context, it is assumed that LEC switch 14 includes a compressor (not shown) as known in the art that modifies the electrical signal in accordance with a number of compression ratios across a range of frequency bands determined in accordance with the inventive concept. That is, the compressor alters the amplitude of the electrical signal to the subscriber, much like FIG. 1, except now unique to the subscriber's loudness perception, such that some audio, or acoustical, signal amplitudes will be compressed, expanded, limited, or not changed at all.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, other test signaling patterns can also be used such as, e.g., wideband signals. In terms of narrowband frequencies, those in the art should be aware that the reference signal and the probe signal should not be too widely-spaced in frequency—else it is possible that the subscriber may become distracted by the different tonal-sound of the signals and not perform the adjustment to the intensity levels of the signals.

In addition, although the inventive concept was illustrated in the context of a sound enhancement service in the telecommunications network, the inventive concept also applies to other areas as well. One example is a telephone station set or equivalent piece of equipment, e.g., a personal computer with a telephone interface. In this context, a telephone station set might be pre-programmed to provide a sound enhancement feature and provide an administrative feature for determining a corresponding compression ratio in accordance with the principles of the invention. Another example is in the context of administering a test, in accordance with the principles of the invention, to set compression parameters for a hearing aid. Indeed, the inventive concept is applicable to any personal communications device.

What is claimed:

1. A method for use in providing a telecommunications service that adjusts an amplitude of an audio signal transmitted to a subscriber, the method comprising the steps of:
   providing an audio test signal pattern to a receiver of a telephone set device of the subscriber;
   adjusting the audio test signal pattern in response to feedback generated by the subscriber via an input device of the telephone set device; and
   specifying at least one parameter as a function of the adjustment of the test signal pattern such that the-at-least one parameter further determines the adjustment to the amplitude of the audio signal at at least one frequency.

2. The method of claim 1 wherein the parameter is a compression ratio.

3. The method of claim 1 wherein the input device is a microphone.

4. The method of claim 1 wherein the input device is a keypad.

5. The method of claim 1 wherein the audio test signal pattern comprises at least two signals played in alternating fashion to the subscriber.

6. The method of claim 5 wherein the adjusting step adjusts the intensity of at least one of the two signals.

7. The method of claim 1 wherein the providing and adjusting steps are performed in repetitive fashion until terminated in response to the feedback.

8. The method of claim 1 wherein the subscriber provides feedback of the audio portions of the audio test signal pattern sound equal in loudness.

9. The method of claim 1 wherein the providing and adjusting steps are repetitively performed in a first phase and a second phase such that in the first phase the audio test signal pattern comprises a reference signal followed by a probe signal and the subscriber adjusts the probe signal to be equal in loudness to the reference signal and in the second phase the audio test signal pattern comprises a combination signal followed by the probe signal and the subscriber adjusts the probe signal to be equal in loudness to the combination signal where the combination signal is made up of the reference signal and the probe signal as adjusted in the first phase.

10. A method to estimate a loss of compression in a cochlea of a person's ear, the method comprising the steps of:
   providing a sequence of acoustical signals to the person;
   instructing the person to balance the loudness of at least two acoustical signals of the sequence; and
   generating, from the balanced acoustical signals, a measure of the loss of compression.

11. The method of claim 10 wherein the measure of the loss of compression is a compression ratio.

12. The method of claim 11 wherein the sequence of acoustical signals comprises at least two signals played in alternating fashion to the person.

13. The method of claim 12 wherein the instructing step instructs the person to adjust the intensity of at least one of the two signals to sound as loud as at least the other one of the two signals.

14. A method for use in providing a telecommunications service that changes an amplitude of an audio signal transmitted to a subscriber, the method comprising the steps of:
   a) providing a first alternating sequence of audio test signals to a receiver of a telephone set device of the subscriber;
   b) receiving an adjustment signal from the subscriber via the telephone set device;
   c) adjusting at least one of the audio signals of the first alternating sequence in response to the adjustment signal;
   d) repeating steps a), b, and c) until terminated by the subscriber;
   e) providing a second alternating sequence of audio test signals to the receiver of the telephone set device of the subscriber where at least one of the signals is determined as a function of the adjustments performed in step c);
   f) receiving another adjustment signal from the subscriber via the telephone set device;
   g) adjusting at least one of the audio signals of the second alternating sequence in response to the adjustment signal of step f);
   h) repeating steps e), f) and g) until terminated by the subscriber;
   i) specifying at least one parameter as a function of the adjustments performed in step and g) such that the-at-least one parameter further determines the change to the amplitude of the audio signal at at least one frequency.

15. The method of claim 14 wherein the subscriber provides feedback until portions of the audio test signal pattern sound equal in loudness.

16. The method of claim 14 wherein the adjustment steps of c) and g) adjust intensity levels of the respective signals.

17. The method of claim 14 wherein the first alternating sequence comprises at least two narrow-band signals separated in frequency.

18. The method of claim 17 wherein the second alternating sequence comprises a combination of narrow-band signals separated in frequency.

19. The method of claim 18 wherein the first alternating sequence comprises a reference signal followed by a probe signal and the probe signal is adjusted in step c).

20. The method of claim 19 wherein the combination of narrow-band signals includes a combined signal comprising the reference signal and the probe signal as adjusted after step c) followed by the probe signal, and wherein step g) further adjusts the probe signal.

21. The method of claim 14 wherein the parameter is a compression ratio.

22. A method for use in a voice-response system, the method comprising the steps of:
 answering a telephone call from a subscriber to establish a telephone connection thereto;
 playing an acoustical test signal pattern to the subscriber via the telephone connection;
 adjusting at least a portion of the acoustical test signal pattern in response to feedback from the subscriber via the telephone connection; and
 specifying at least one parameter as a function of the adjustment such that the-at-least one parameter further determines a compressor response for use in providing a sound enhancement service to the subscriber.

23. The method of claim 22 wherein the adjusting step adjusts an intensity level.

24. The method of claim 22 wherein the subscriber provides feedback until portions of the acoustical test signal pattern sound equal in loudness.

25. The method of claim 22 wherein the playing and adjusting steps are performed in a repetitive manner until terminated by the subscriber.

26. The method of claim 25 wherein the playing and adjusting steps are repetitively performed in a first phase and a second phase such that in the first phase the acoustical test signal pattern comprises a reference signal followed by a probe signal and the subscriber adjusts the probe signal to be equal in loudness to the reference signal and in the second phase the acoustical test signal pattern comprises a combination signal followed by the probe signal and the subscriber adjusts the probe signal to be equal in loudness to the combination signal where the combination signal is made up of the reference signal and the probe signal as adjusted in the first phase.

27. The method of claim 22 wherein the parameter is a compression ratio.

28. A method to estimate a loss of compression in a cochlea of a person's ear, the method comprising the steps of:
 instructing the person to balance the loudness of two acoustical signals; and
 generating, from the balanced acoustical signals, a measure of the loss of compression at a frequency of one of the two acoustical signals.

29. The method of claim 28 wherein the measure of the loss of compression is a compression ratio.

30. The method of claim 28 further comprising the step of repeating the instructing and generating steps such that a measure of the loss of compression over a frequency range is generated.

31. The method of claim 30 further comprising the step of using the measure of the loss of compression in a device that provides acoustical signals to the person such that the device compensates for the person's loss of compression.

32. The method of claim 31 wherein the device is a hearing aid.

33. The method of claim 31 wherein the device provides at least audio communications to another person.

34. The method of claim 33 wherein the device is a telephone.

35. The method of claim 30 further comprising the step of using the measure of the loss of compression in a telecommunications network that provides audio signals to the person such that the telecommunications network compensates for the person's loss of compression.

36. The method of claim 28 wherein the instructing step further comprises the steps of:
 a) adjusting the loudness of a probe signal to sound like the loudness of a reference signal;
 b) generating a combined signal that represents the adjusted probe signal from step a) and the reference signal; and
 c) adjusting the loudness of the probe signal to sound like the loudness of the combined signal;
 wherein the measure of the loss of compression is at a frequency of the probe signal.

* * * * *